United States Patent [19]

Yamada et al.

[11] Patent Number: 5,315,088
[45] Date of Patent: May 24, 1994

[54] ELECTRIC DISCHARGE MACHINING APPARATUS WITH SWITCH CONNECTION BETWEEN WORKPIECE AND MOUNT

[75] Inventors: Hisashi Yamada; Takuji Magara, both of Nagoya, Japan

[73] Assignee: Mitsubishi Denki Kabushiki Kaisha, Tokyo, Japan

[21] Appl. No.: 983,714

[22] Filed: Dec. 1, 1992

[30] Foreign Application Priority Data

Dec. 3, 1991 [JP] Japan .................. 3-319091

[51] Int. Cl.⁵ .............................. B23H 7/04
[52] U.S. Cl. ................... 219/69.12; 200/83 C; 219/69.13; 335/285
[58] Field of Search .......... 219/69.12, 69.13; 200/83 C; 335/285

[56] References Cited

U.S. PATENT DOCUMENTS

| | | | |
|---|---|---|---|
| 1,633,521 | 6/1927 | Edwards | 200/83 C |
| 2,856,565 | 10/1958 | Matulaitis | 219/69.13 |
| 3,192,517 | 6/1965 | Werlin | 335/285 |
| 3,825,705 | 7/1974 | Bourton | 335/285 |
| 4,215,254 | 7/1980 | Ohki | 200/83 C |
| 4,628,172 | 12/1986 | Inoue | 219/69.12 |
| 4,633,213 | 12/1986 | Venema | 200/83 C |
| 4,788,400 | 11/1988 | Aso et al. | 219/69.12 |
| 4,803,327 | 2/1989 | Obara | 219/69.12 |

FOREIGN PATENT DOCUMENTS

| | | | |
|---|---|---|---|
| 898322 | 11/1953 | Fed. Rep. of Germany . | |
| 3707673 | 3/1987 | Fed. Rep. of Germany . | |
| 58-137523 | 8/1983 | Japan | 219/69.12 |
| 61-219518 | 9/1986 | Japan | 219/69.13 |

Primary Examiner—Geoffrey S. Evans
Attorney, Agent, or Firm—Sughrue, Mion, Zinn, Macpeak & Seas

[57] ABSTRACT

In an electric discharge machining apparatus, a workpiece electrically connected to a body of the machine and a jig on which the workpiece rests are electrically isolated from each other. The body and the workpiece are selectively switched in open-circuit/short-circuit by a switch. Switching can be made on the stool or the workpiece. Further, the switch and the workpiece and the jig are connected to each other by a coaxial cable.

10 Claims, 11 Drawing Sheets

ELECTRIC DISCHARGE MACHINING APPARATUS WITH SWITCH CONNECTION BETWEEN WORKPIECE AND MOUNT

FIELD OF THE INVENTION

The present invention relates to an electric discharge machining apparatus in which electric discharge occurs between a workpiece and a processing electrode which is fed while a predetermined gap is maintained between the workpiece and the processing electrode, to electrically machine the workpiece by energy of the electric discharge and, more particularly, to an electric discharge machining apparatus in which normal or usual processing and finish processing can automatically be executed.

BACKGROUND OF THE INVENTION

Generally, in a wire-cut electric discharge machining apparatus, an electric discharge energy is reduced to execute processing, in order to produce an superior surface finish. Here, the electric discharge energy is in proportion to a product between an electric discharge current Ip and an electric discharge on-time τp. The electric discharge current Ip and the electric discharge on-time τp in the case of electric discharge of a capacitor can be found by the following equations:

$$Ip = (Eo - Ea)\sqrt{(C/L)} \qquad (1)$$

$$\tau p = \pi\sqrt{LC} \qquad (2)$$

where
Eo is electric discharge voltage;
Ea is arc voltage;
C is an electrostatic capacity; and
L is an inductance.

As described above, the wire-cut electric discharge machining apparatus has the following problem. That is, the discharge energy cannot be controlled to a value smaller than a certain value, because the machine body has a stray electrostatic capacity, so that there is a limit in to the quality of the surface finish of a processed surface.

In the conventional arrangement, in order to solve the above-discussed problem, there has been proposed in Japanese Patent Laid-Open No. SHO 61-197128 and Japanese Patent Laid-Open No. SHO 61-270022 a machine in which, in order to improve the surface finish during finish processing, a machine body and a workpiece are electrically isolated from each other. However, in general processing including rough processing and semi-finish operations conducted until the finish operation, the machine body and the workpiece are short-circuited to each other. These two conditions are automatically executed by the use of an electromagnetic switch.

Figure 12:
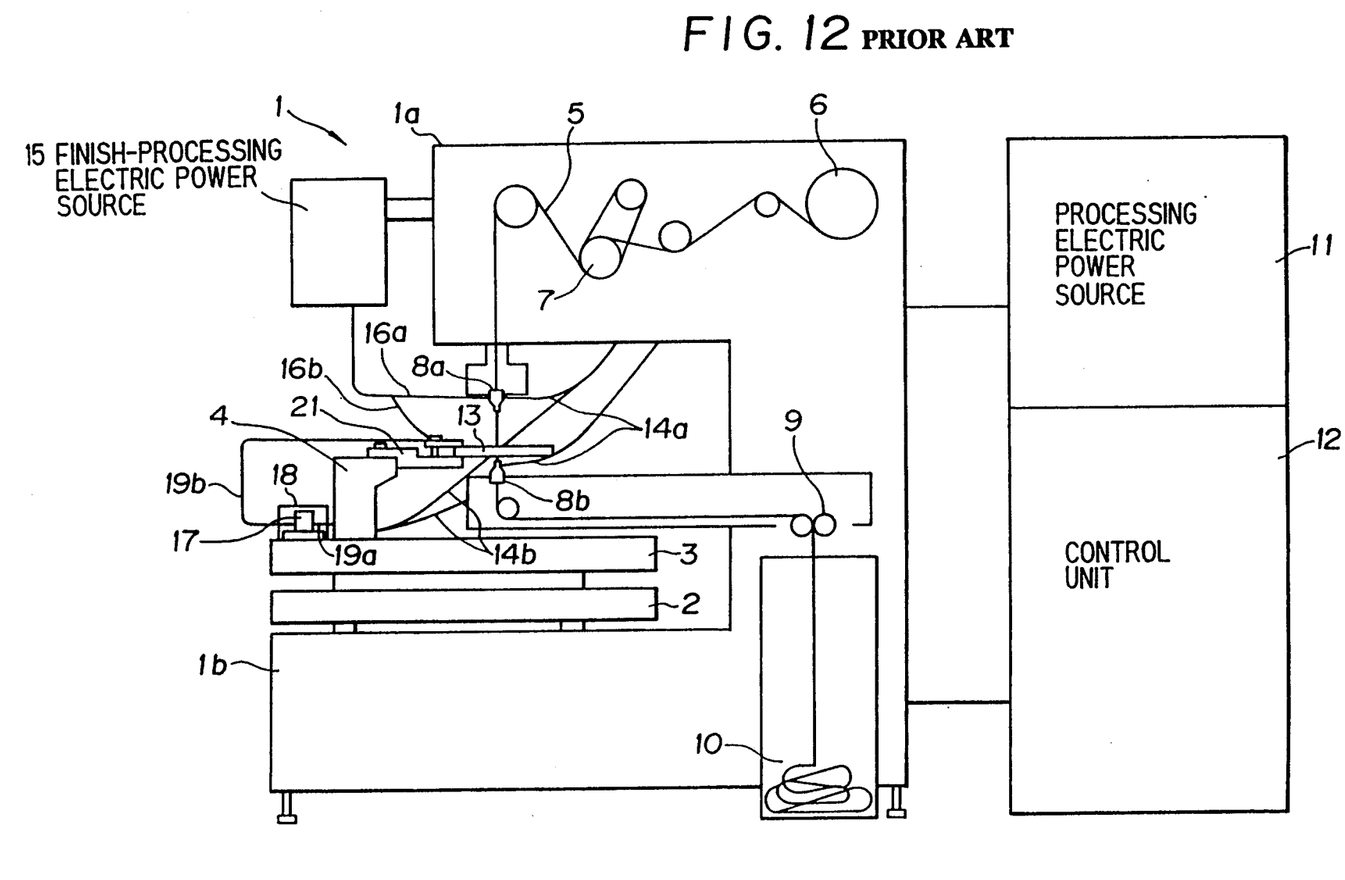
FIG. 12 is a view for explanation showing an entire arrangement of a conventional electric discharge machining apparatus.

FIG. 12 is a view showing a conventional wire-cut electric discharge machining apparatus. In FIG. 12, the reference numeral 1 denotes a machine body; 1a, a column; 1b, a bed; 2 and 3, cross tables movable respectively in an X-direction and a Y-direction, which are mounted on the bed 1b; 4, a metal surface plate or a jig which is mounted on the cross table 3; 5, a wire electrode; 6, a supply bobbin for supplying the wire electrode 5; 7, a powder brake for applying a tension to the wire electrode 5; 8a, an upper guide for guiding the wire electrode 5 to a location between a pair of poles; 8b, a lower guide; 9, a pair of winding rollers for winding the used wire electrode 5; 10, the used wire electrode; 11, a processing electric power source; 12, a control unit; 13, a workpiece; 14a, a feeder wire through which an energy is supplied to the wire electrode 5 from the processing electric power source 11; and 14b, a feeder wire through which the energy is supplied to the workpiece.

Figure 13:
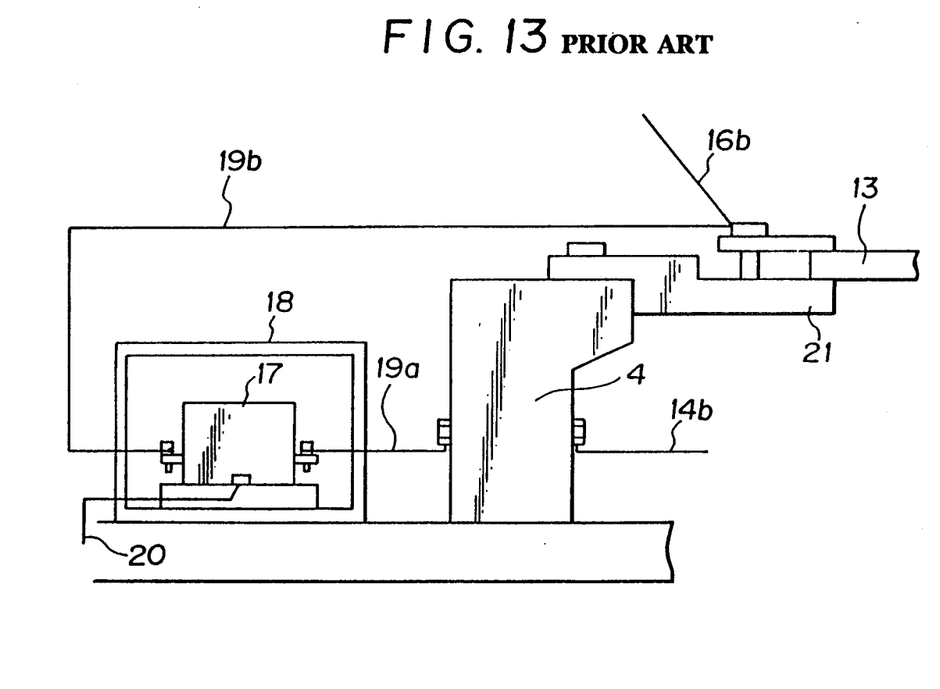
FIG. 13 is a view for explanation showing insulation/short-circuit switching means of the conventional electric discharge machining apparatus illustrated in FIG. 12.

Further, the reference numeral 15 denotes a finish-processing electric power source; 16a and 16b, feeder wires through which an energy is supplied from the finish-processing electric power source 15; and 17, an electromagnetic switch. FIG. 13 is an enlarged view of the environment surrounding the electromagnetic switch, 17. The reference numeral 18 denotes a case for protecting the electromagnetic switch 17 from a processing liquid; 19a and 19b, short-circuit wires for short-circuiting the 4 and the workpiece 13 to each other; 20, a signal line from the control unit 12 which controls turning-on and -off of the electromagnetic switch 17; and 21, an insulating jig formed of an electric insulating material. The arrangement is such that the insulating jig 21 is fixedly mounted on the jig 4 by screws or the like, the workpiece 13 is mounted on the insulating jig 21, and the feeder wire 16a from the finish-processing electric power source 15 is connected to the workpiece 13, whereby the finish-processing electric power source 15 is electrically isolated from the jig 4, that is, from the machine body 1. Furthermore, when the electromagnetic switch 17 is turned on by the control unit 12, the jig 4 and the workpiece 13 are electrically connected through the short-circuit wires 19a and 19b.

The conventional machine is constructed as described above. Accordingly, in the normal processing including rough processing and semi-finish processing, the electromagnetic switch 17 is brought to the ON-condition. Specifically, one of a pair of poles of the processing electric power source 11 is connected to the wire electrode 5 through the feeder wire 14a, and the other pole is connected to the workpiece 13 through the feeder wire 14b, the short-circuit wire 19a, the electromagnetic switch 17 and the short-circuit wire 19b, so that a processing energy is supplied to execute processing. Moreover, in the finish processing, the electromagnetic switch 17 is brought to an electrically isolated condition. Specifically, one of a pair of poles of the finish-processing electric power source 15 is connected to the wire electrode 5 through the feeder wire 16a, and the other pole is connected to the workpiece 13 through the feeder wire 16b. Further, since the short-circuit wires 19a and 19b are isolated from each other, a stray capacity of the wire electrode 5 and with respect to 4, that is, the machine body 1 is eliminated. Thus, processing in which the stray capacity is very small is made possible. As described above, if the machine is arranged such that the electromagnetic switch 17 is automatically turned on and off depending upon selection of the processing electric power source 11 or the finish-processing electric power source 15, the surface finish at finish processing is improved, and provision of the processing electric power source eliminates the necessity for changing the feeder wires during processing.

The above-described wire electric discharge machining apparatus is advantageous in the case where the processing energy is supplied from the finish-processing electric power source 15 to execute processing which improves the surface finish. Conversely, in the case where the processing energy is supplied from the processing electric power source 11 to execute normal or usual processing, connection from the processing, electric power source 11 to the workpiece 13 is through to a path from the feeder wire 14b the jig 4 the short-circuit wire 19a, the electromagnetic switch 17, the short-circuit wire 19b, and the workpiece 13. Generally, the cross-sectional area of the jig 4 is extremely large relative to the feeder wires, and it is considered that a value of an inductance from a mounting position of the feeder wire 14b on the jig 4 to a mounting position of the workpiece 13 is substantially constant on the jig 4. Accordingly, in the case where the isolating jig 21 is used, since the feeder wire from the finish-processing electric power source 15 to the workpiece 13 passes through the electromagnetic switch 17, the inductance largely increases dramatically because of an increase in the length of feeder wire and because of the fact that a circuit is brought to a loop configuration.

"Wire Electric Discharge Machine" disclosed in Japanese Patent Laid-Open No. SHO 62-188625 describes such a conventional device.

The conventional wire electric discharge machining apparatus constructed as described above has the following problems. That is, the increase in the inductance reduces the processing current value, and reduces the processing speed or rate. Further, adhering of an electrode material of the wire electrode to the workpiece also increases. Thus, the processing treatment will be impeded or hindered. Furthermore, since the value of the processing current varies depending upon the length of the feeder wire, there is a problem if the length of the feeder wire can not be constant to produce a constant processing accuracy.

In view of the above, in the conventional wire discharge machine, the mounting position of the electromagnetic switch and the mounting position of the insulating jig must be as close as possible in order to reduce the inductance of the feeder wire by shortening the feeder wire. However, it is not practical that the electromagnetic switch 17 is mounted within a processing liquid, particularly, in a wire electric discharge machining apparatus of type in which a processed or processing section is immersed within the processing liquid. Accordingly, that the electromagnetic switch 17 must be mounted on a location spaced apart from the jig. Further, the mounting position of the insulating jig, that is, the mounting position of the workpiece can not be a position where the feeder wire can reach. Thus, the mounting position is limited or restricted.

SUMMARY OF THE INVENTION

It is therefore an object of the invention to provide an electric discharge machining apparatus in which stray capacity between a wire electrode and a workpiece can automatically be reduce during at processing, an inductance between the wire electrode and the workpiece is reduced at normal processing, there is no change in the inductance due to a mounting position of the workpiece on a jig, and there is no limit or restriction in the mounting position of the workpiece.

In the arrangement of the invention, insulation means is provided for electrically insulating the workpiece and the stool from each other and a switching means is provided for selectively switching between an open-circuit or a short circuit condition between the body and the work. This produces the following advantages. Switching is made on the jig or the workpiece. Accordingly, the stray capacity between the wire electrode and the workpiece can automatically be reduced at finish processing, while the inductance between the wire electrode and the workpiece is reduced at normal or usual processing. A change in inductance due to the mounting position of the workpiece on the jig can also be eliminated. Thus, no limit or restriction is given to the mounting position of the workpiece.

Preferably, the electric discharge machining apparatus further comprises a magnet, wherein the switching means is fixedly mounted on the jig by the magnet. With the above arrangement, since the switching means is mounted on the stool by the magnet, it is possible to mount the switching means at any optional position on the jig.

In the present invention, an insulation means for electrically insulating the workpiece and the stool from each other and the switching means for selectively switching between open-circuit and a short circuit condition between the body and the workpiece are provided, and the workpiece or the jig and the switching means are connected to each other by a coaxial or concentric wire. With this arrangement, the following advantages are achieved. A stray capacity between the wire electrode and the workpiece can automatically be reduced at finish processing, while an inductance between the wire electrode and the workpiece is reduced at normal or usual processing. Moreover, a change in inductance due to the mounting position of the workpiece on the stool can be eliminated. Thus, no limit or restriction is given to the mounting position of the workpiece.

Other objects and features of this invention will become apparent from the following description with reference to the accompanying drawings.

DESCRIPTION OF THE EMBODIMENTS

Figure 1:
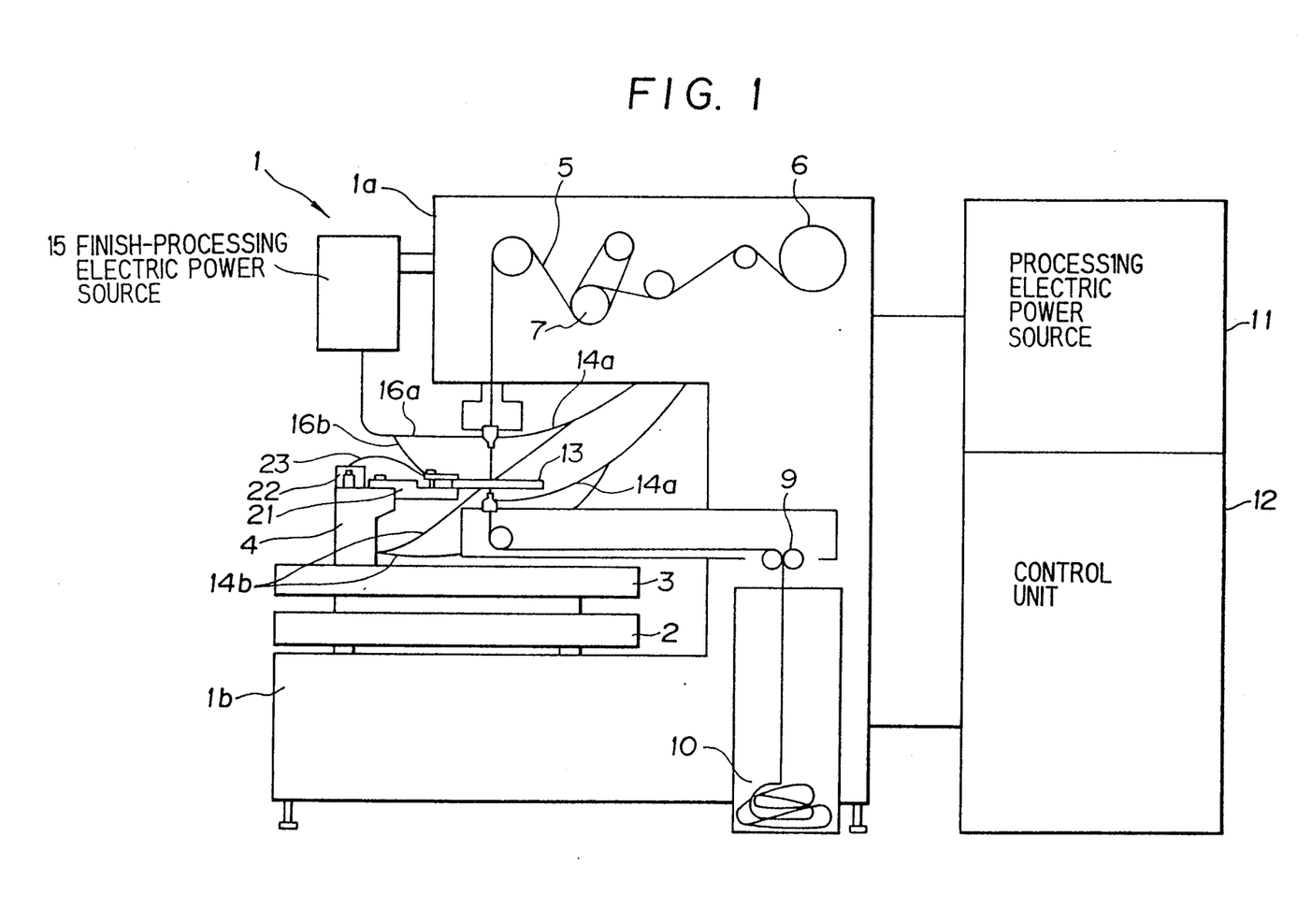
FIG. 1 is a view showing a schematic arrangement of an electric discharge machining apparatus according to the invention.
Figure 2:
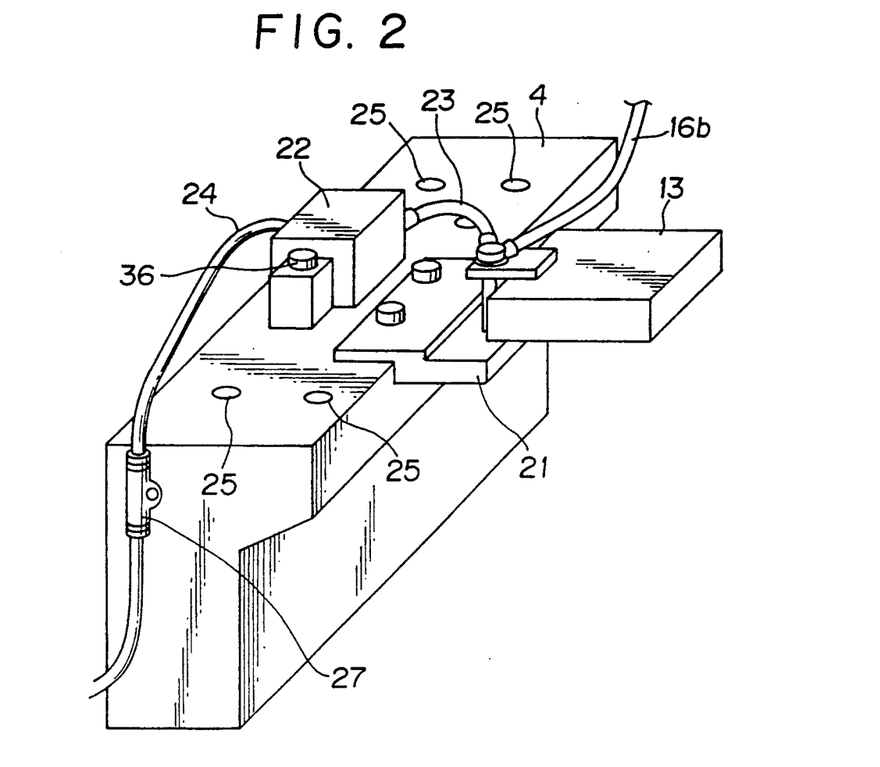
FIG. 2 is a perspective view showing insulation/short-circuit switching means of the electric discharge machining apparatus according to the invention.

Referring first to FIG. 1, there is shown a wire electric discharge machining apparatus according to an embodiment of the invention. In FIG. 1, the reference numerals 1 to 16 and 21 denote parts and elements the same as or equivalent to those of the aforesaid conventional example, which are designated by the same reference numerals. The reference numeral 22 denotes a switch which is operated by pneumatic pressure or the like; and 23, a feeder wire through which the switch 22 is connected to the workpiece 13. Further, FIG. 2 shows, in detail, portions of the respective workpiece 13 and switch 22. The reference numeral 24 denotes a hose through which the pneumatic pressure or the like which actuates the switch 22 is supplied. The switch 22 is fixedly mounted directly on the stool 4 by screws or the like. In FIG. 2, the reference numeral 25 denotes threaded bores; and 27, a coupling for the hose 24.

Figure 3:
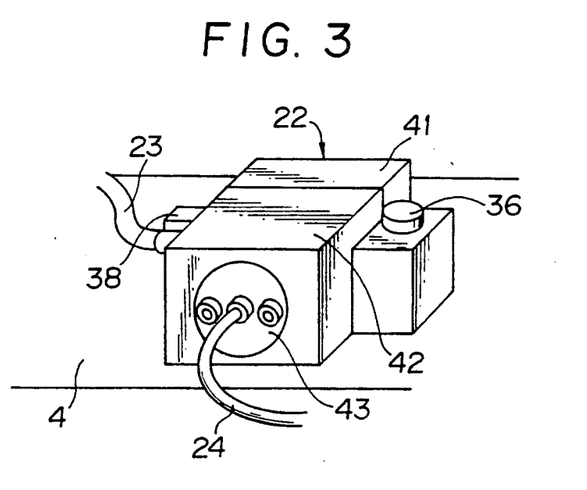
FIG. 3 is a perspective view showing an outline or outer appearance of a switch illustrated in FIG. 1.
Figure 4A:
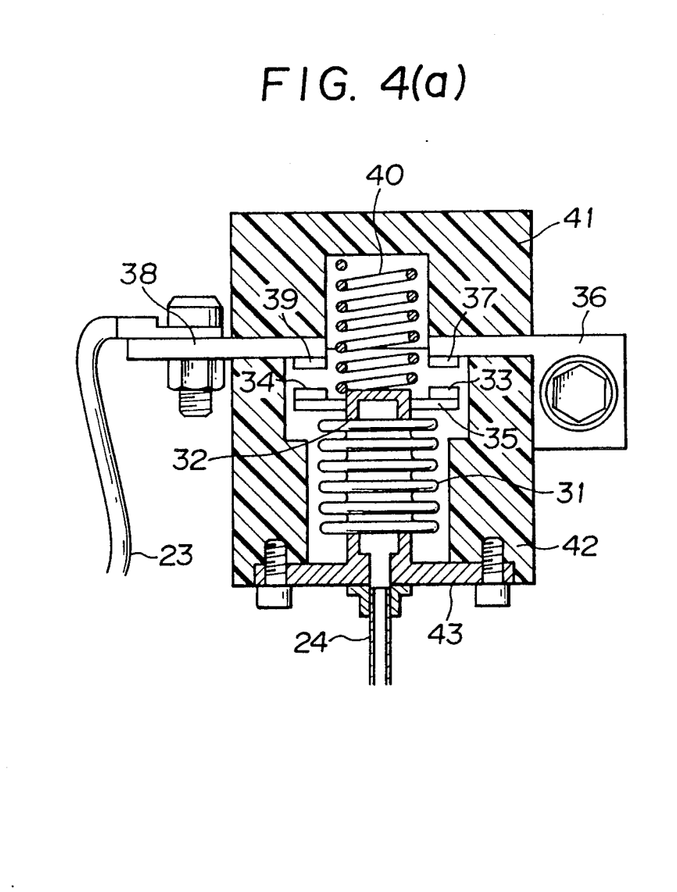
FIGS. 4(a) and 4(b) are cross-sectional views showing arrangement/operation of the switch illustrated in FIG. 3.
Figure 4B:
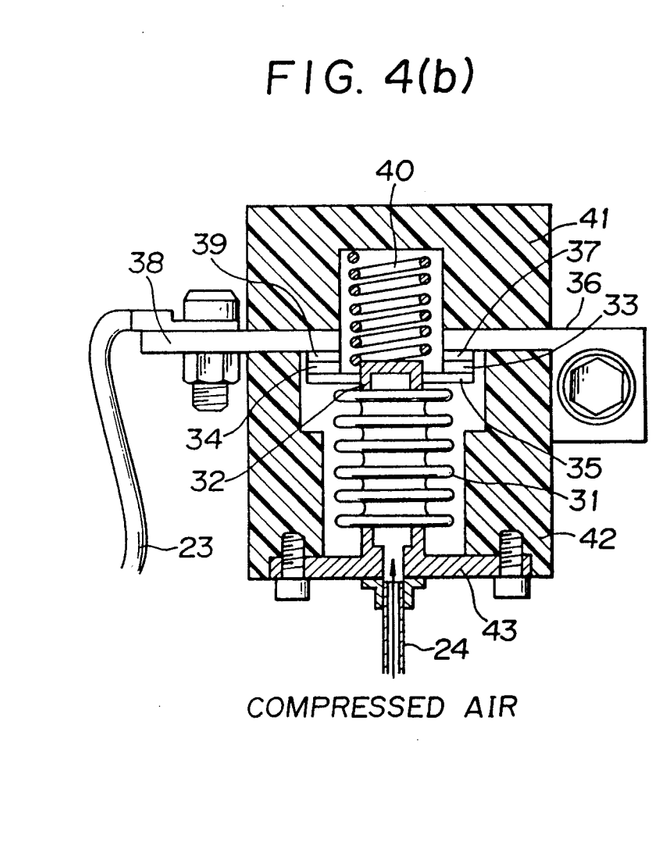

FIG. 3 is an outline of the switch 22 illustrated in FIG. 1, while FIG. 4(a) and 4(b) are cross-sectional views of the switch 22. As shown in FIG. 4(a), the reference numeral 31 denotes a metal bellows; and 32, a metal cap. The metal cap 32 is fixedly connected to an upper end of the metal bellows 31 by welding or the like, which is arranged to be extended and contracted by pneumatic pressure from a lower end of the metal bellows 31. The reference numeral 35 denotes a metal plate which has a pair of contacts 33 and 34. The metal plate 35 is fixedly mounted on the cap 32 by welding or the like. The reference numeral 36 denotes a terminal which has a contact 37. The terminal 36 is fixedly mounted directly on the jig 4 by bolts or the like. The reference numeral 38 denotes a terminal which has a contact 39, and which is connected to the workpiece 13 by the feeder wire 23.

Further, the reference numeral 40 denotes a coil spring which has a spring force larger than that of the metal bellows 31. The reference numerals 41 and 42 denote cases. The coil spring 40 is extended and contracted while being guided by an inner surface of the case 41. The coil spring 40 has a lower end which is in contact with the cap 32. The cases 41 and 42 are formed of an electrically insulating material such as resin or the like. The terminals 36 and 38 are fixedly mounted on the cases 41 and 42 under an electrically insulated condition. The reference numeral 43 denotes a flange which is joined to the lower end of the metal bellows 31 by welding or the like. The flange 43 is, fixedly mounted on the case 42 by bolts or the like, and is electrically insulated from the terminals 36 and 38.

Operation of the switch 22 illustrated in FIGS. 4(a) and 4(b) will be described. FIG. 4(a) shows the switch 22 in a turning-off condition, while FIG. 4(b) shows the switch 22 in a turning-on condition. As shown in FIG. 4(a), the metal bellows 31 is contracted by a spring pressure of the coil spring 40 when pneumatic pressure is not applied to the metal bellows 31, so that the contacts 33 and 34 are spaced respectively from the contacts 37 and 39. The terminals 36 and 38 are thus in an insulated condition. That is, the workpiece 13 and the jig 4 are in an insulated condition. Further, as shown in FIG. 4(b), when pneumatic pressure is applied to a space within the metal bellows 31 through the hose 24, the pressure within the metal bellows 31 rises. The entire length of the metal bellows 31 is extended while depressing the coil spring 40. Finally, the contacts 33 and 34 are in contact respectively with the contacts 37 and 39 and become stationary. Under this condition, the terminals 36 and 38 are in a conductive condition, that is, the workpiece 13 and the jig 4 are in a conductive condition.

Operation of the preferred embodiment will next be described. Normally, in the wire electric discharge processing, after rough processing and semi-finish operations, in which an energy is large, have been executed, processing, in which an energy is extremely small, is finally executed, to finish the processing of a processed surface of the workpiece 13 to a fine surface. During the normal processing, including the rough processing and the semi-finish processing, a command is given to the control unit 12 by an external input, an NC program or the like, to select the processing power source 11. A command is further outputted to feed compressed air to the hose 24, thereby bringing the switch 22 to a conductive condition. Under the condition described above, processing starts. Then, one of the pair of poles of the processing electric power source 11 is connected to the wire electrode 5 through the feeder wire 14a, while the other pole is connected to the workpiece 13 through the feeder wire 14b, the jig 4, the switch 22 and the feeder wire 23. A processing energy is supplied to a feeder circuit from the processing electric power source 11. Electric discharge which is generated between the workpiece 13 and the wire electrode 5 executes processing treatment.

Here, the feeder wire 23 is made as short as possible in order to reduce the effect of inductance, since inductance of a wire increase as a wire become long, however, some inductance is inherent in the wire. Nevertheless, the inductance of the jig 4 in the aforesaid feeder circuit still will be extremely small as compared with the feeder wire. Accordingly, the inductance is considered to be substantially constant regardless of a distance between the switch 22 and the fixed position of the feeder wire 14b to the stool 4. Therefore, processing is made possible with an equivalent processing energy with a variable position of the switch 22 on the stool 4. Subsequently, in the finish processing, the control unit 12 selects the processing electric power source 15, and the compressed air fed into the hose 24 is cut off, whereby the switch 22 is brought to such a condition as to be isolated electrically. When processing starts under the above-described condition, one of the pair of poles of the processing electric power source 15 is connected to the wire electrode 5 through the feeder wire 16a, while the other pole is connected to the workpiece 13 through the feeder wire 16b. Further, since the feeder wire 23 and the jig 4 are isolated from each other, processing in which the stray capacity is extremely small is made possible.

Figure 5:
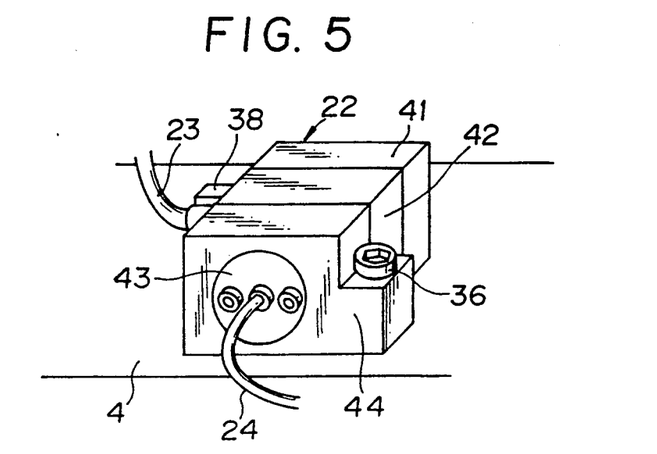
FIG. 5 is a perspective view showing an outline of another embodiment of the switch illustrated in FIG. 1.
Figure 6:
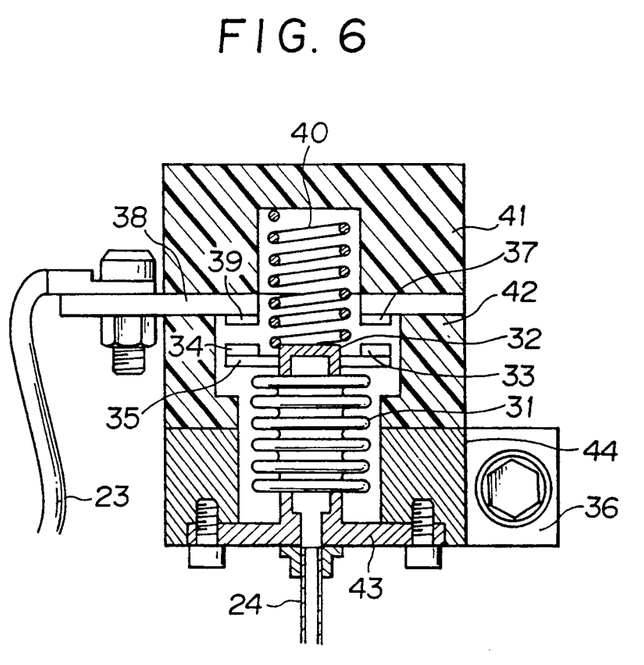
FIG. 6 is a cross-sectional view showing an arrangement of the switch illustrated in FIG. 5.

FIG. 5 is an outline of another embodiment of the switch 22 illustrated in FIG. 1, while FIG. 6 is a cross-sectional view of the switch 22. In FIG. 6, the case 42 of the embodiment illustrated in FIG. 4 has a portion formed of a conductive material such as metal or the like, that is, the another embodiment has a conductive case 44 formed of a conductive material such as metal or the like. The flange 43 is fixedly mounted on the conductive case 44. Furthermore, the conductive case 44 is fixedly mounted on the stool 4. Thus, the metal bellows 31 per se is brought to an electric potential the same as that of the stool 4. Accordingly, when the metal bellows 31 is extended by the pneumatic pressure so that the contacts 34 and 39 are in contact with each other, the workpiece 13 and the stool 4 are brought to a conductive condition through the metal bellows 31.

Figure 7A:
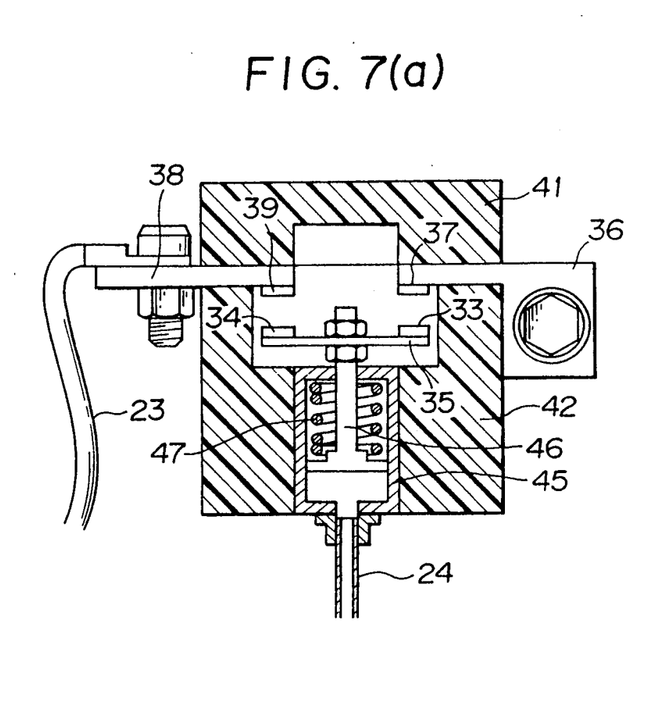
FIGS. 7(a) and 7(b) are cross-sectional views showing the arrangement and operation of another embodiment of the switch illustrated in FIG. 1.
Figure 7B:
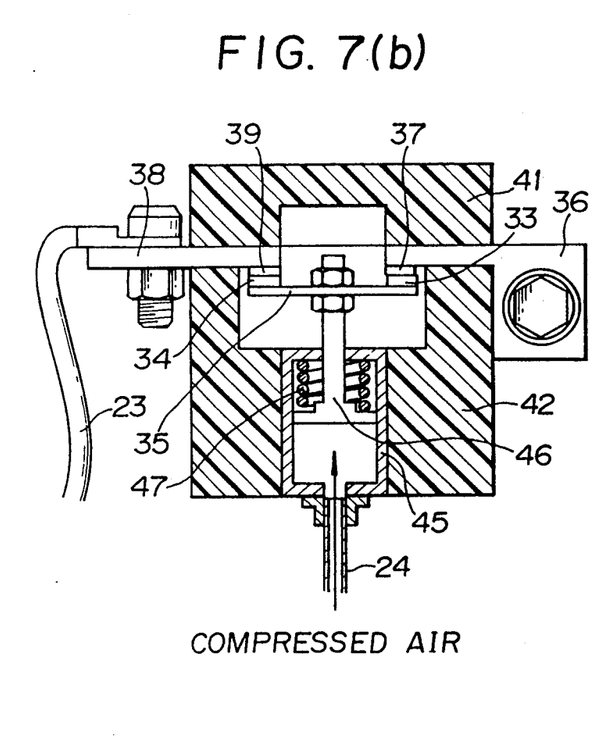

FIGS. 7(a) and 7(b) are cross-sectional views of still another embodiment of the switch 22 illustrated in FIG. 1. In FIG. 7, portions and parts the same as or equivalent to those of the aforesaid embodiment are designated by the same reference numerals, and the description of the same or like reference numerals will be omitted. The reference numeral 45 denotes a single acting cylinder with a spring; 46, a piston rod movable along the cylinder 45 therewithin; and 47, a spring. The piston rod 46 has an upper end on which the metal plate 35 is fixedly mounted. The piston rod 46 can be moved vertically by pneumatic pressure and spring force. The reference numerals 41 and 42 denote cases which are formed of an insulating material such as resin or the like. The cases 41 and 42 fix the terminals 36 and 38 and the cylinder 45 under an electrically insulated condition.

Operation of this embodiment will next be described. FIG. 7(a) shows the switch 22 in a turning-off condition, while FIG. 7(b) shows the switch 22 in a turning-on condition. As shown in FIG. 7(a), under a condition that a pneumatic pressure is not applied, the piston rod 46 is depressed by the spring 47, and the contacts 33 and 34 are spaced respectively away from the contacts 37 and 39. Thus, the terminal 36 and the terminal 38 are in an isolated condition. As shown in FIG. 7(b), when the pneumatic pressure is applied to a space within the cylinder 45, the piston rod 46 is moved upwardly, and the contacts 33 and 34 are in contact respectively with the contacts 37 and 39. Thus, the terminal 36 and the terminal 38 are in a conductive condition.

Figure 8:
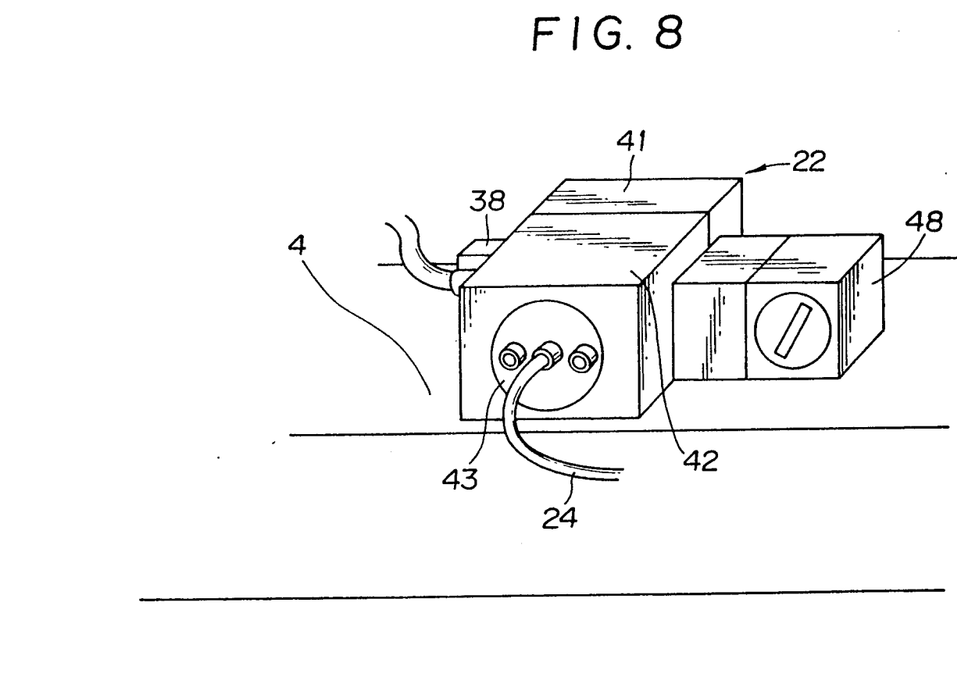
FIG. 8 is a perspective view showing an outline of another embodiment of the switch illustrated in FIG. 1.

In connection with the above, in the aforesaid embodiments, the body of the switch 22 is fixedly mounted on the jig 4 by screws or the like. As shown in FIG. 8, however, the body of the switch 22 is fixedly mounted on a magnet 48. Advantage of this arrangement are similar or equivalent to a case where the body of the switch 22 is fixedly mounted directly on the jig 4 by bolts or the like, because the magnet 48 is conductive. Further, there is produced an advantage that it is possible to fixedly mount the switch 22 on any desirable location on the stool 4.

Figure 9:
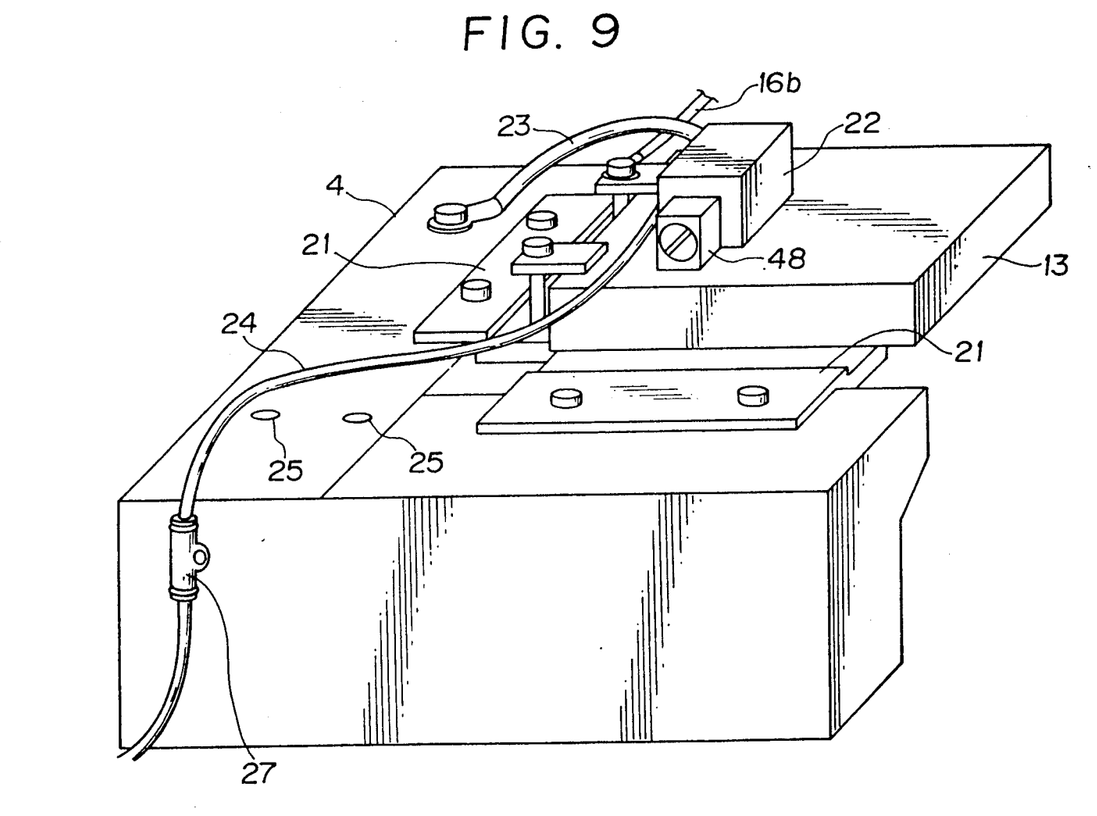
FIG. 9 is a perspective view, as a whole, showing another mounting embodiment of the switch illustrated in FIG. 8.

Furthermore, the arrangement may be such that, as shown in FIG. 9, one of a pair of terminals of the switch 22 is fixedly mounted directly on the workpiece 13 by the magnet 48, while the other terminal is connected to the jig 4 through the feeder wire 23. With the arrangement, it is possible to produce advantages equivalent to those of the aforesaid embodiments by operation similar thereto. According to the embodiment illustrated in FIG. 9, there can be produced an advantage that, in the case where the workpiece 13 is relatively large, the switch 22 is fixedly mounted on a location adjacent to the proceeded or processing portion.

Figure 10:
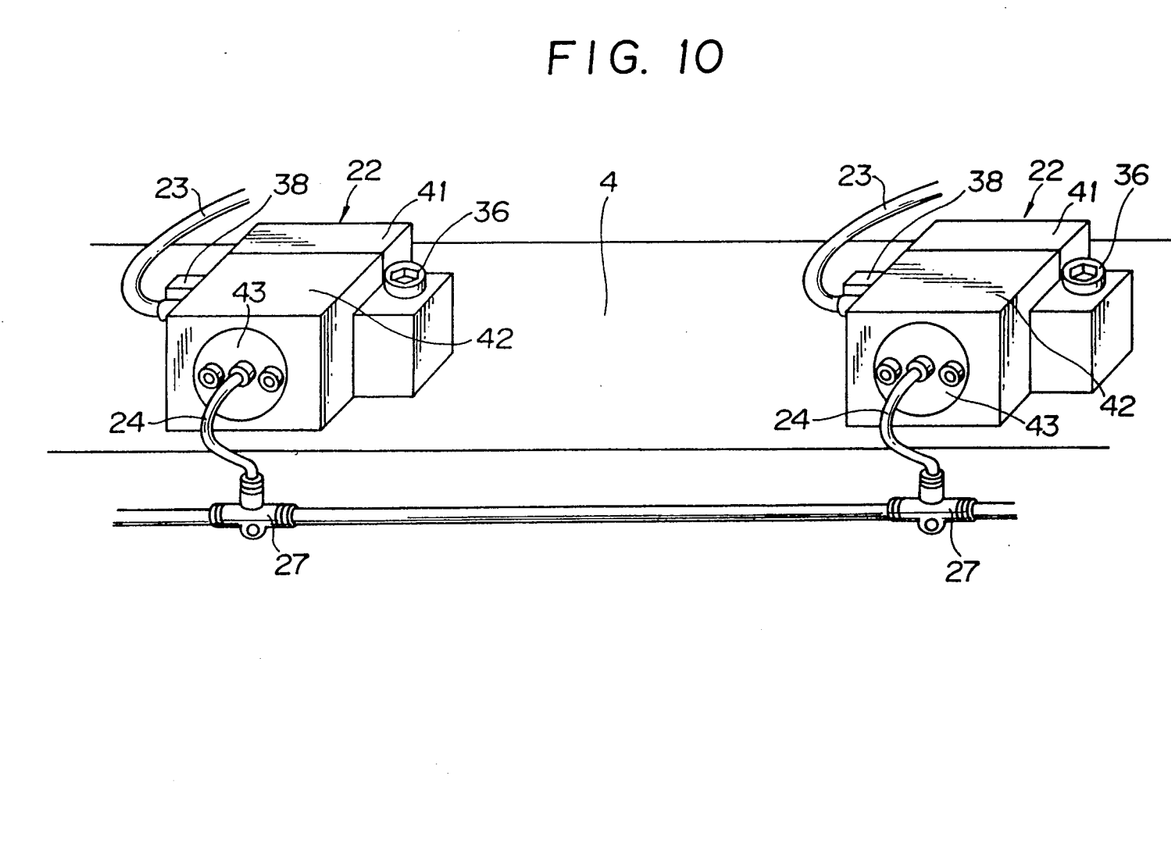
FIG. 10 is a view for explanation showing a use example in the case where a plurality of switches according to the invention are employed.

Moreover, as shown in FIG. 10, a plurality of couplings 27 are provided respectively at optional locations on the jig 4, whereby it is possible to select one or more of the couplings 27, which is or are located adjacent to the mounting position of the switch 22. In the case where the position of the switch 22 is spaced apart away from the position of the coupling 27, it is not necessary to lengthen the hose 24, making it possible to eliminate interference with the processing treatment. Further, when a plurality of workpieces 13 are fixed at once, it is made possible to use a plurality of switches 22. Thus, there can be produced a processing characteristic entirely equivalent to the case of a single switch.

Figure 11:
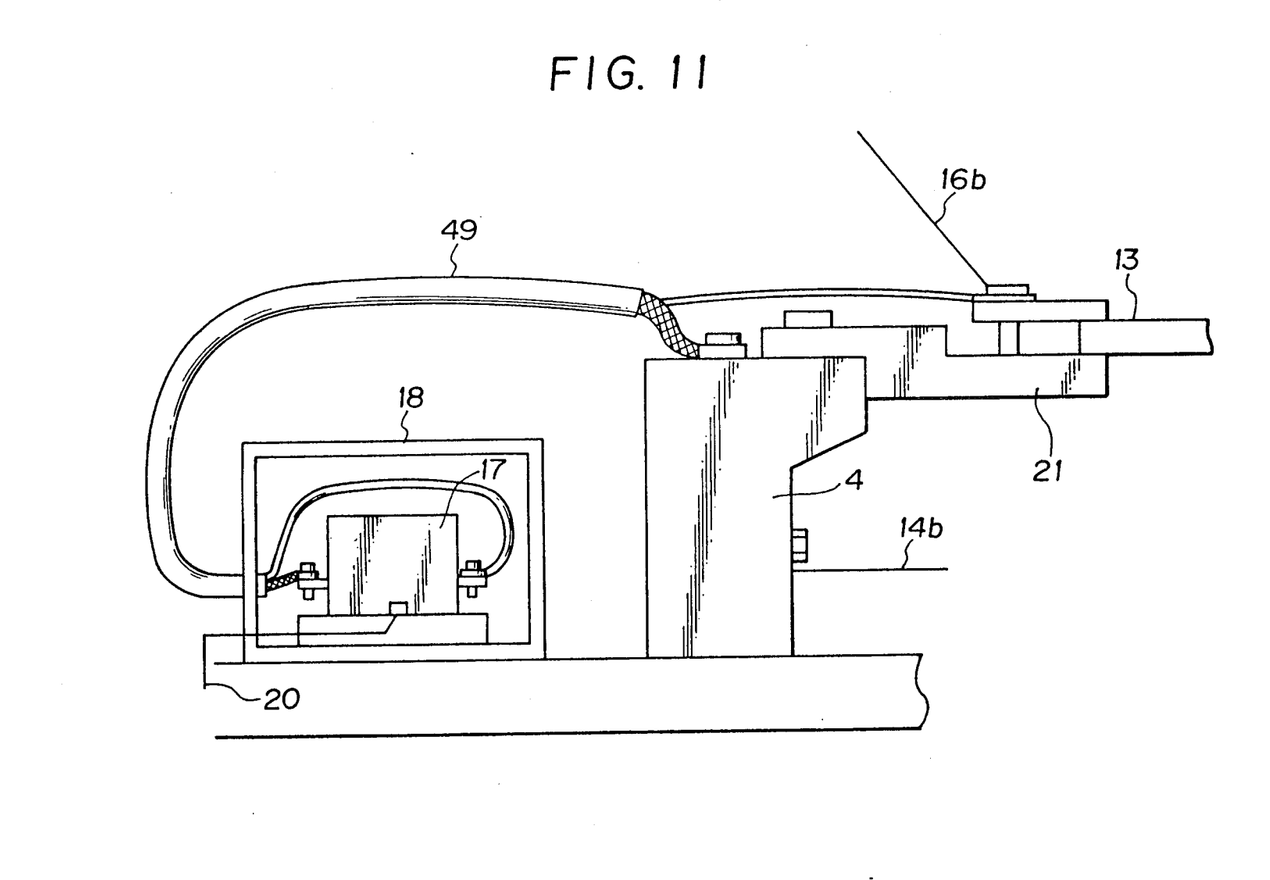
FIG. 11 is a view showing insulation/short-circuit switching means according to another embodiment of the invention.

FIG. 11 shows another embodiment according to the invention. In FIG. 11, the reference numeral 49 denotes a concentric or coaxial cable. The arrangement is such that a central conductor and an outer conductor of the coaxial cable 49 have their respective one ends which are fixedly mounted on the workpiece 13, while the other ends of the respective central and outer conductors are fixedly mounted on the jig 4. Moreover, the other ends of the respective central and outer conductors of the coaxial cable 49 are connected to the terminal of the electromagnetic switch 17.

Operation will next be described. In normal or usual processing including rough processing and semi-finish processing, one of the pair of poles of the processing electric power source 11 is connected to the wire electrode 5 through the feeder wire 14a, while the other pole is connected to the feeder wire 14b. Furthermore, the electromagnetic switch 17 is brought to a conductive condition, and the processing electric power source 11 is connected to the electromagnetic switch 17 through the coaxial cable 49, while the processing electric power source 11 is connected to the workpiece 13 through the coaxial cable 49. A processing energy is supplied to the wire electrode 5 and the workpiece 13. Thus, processing is executed.

Further, in the finish processing, the electromagnetic switch 17 is brought to an electrically insulated condition. One of the pair of poles of the processing electric power source 15 is connected to the wire electrode 5 through the feeder wire 16a, while the other pole is connected to the workpiece 13 through the feeder wire 16b. Since the embodiment illustrated in FIG. 11 operates as described above, in the coaxial cable 49 in the feeding path to the workpiece 13 during the normal or usual processing, the inductance is canceled, so that the inductance of the entire feeding path is reduced. Furthermore, since the inductance is made constant regardless of the length of the coaxial cable 49, no limit or restriction is given to the mounting position of the electromagnetic switch 17 and the mounting position of the workpiece 13.

In connection with the above, the embodiment uses the electromagnetic switch 17 in order for switching between open-circuit and short-circuit states of the workpiece 13 and the jig 4. However, advantages are similar or equivalent to each other if the switch 22 operated by the pneumatic pressure or the like illustrated in another embodiments is employed.

In connection with the above, the pneumatic pressure is used for operation of the switch 22 in the above-described embodiments. However, there can be produced similar advantages if other means such as hydraulic pressure is used.

Although the invention has been described with respect to specific embodiments for a complete and clear disclosure, the appended claims are not to be thus limited but are to be construed as embodying all modifications and alternative constructions that my occur to one skilled in the art which fairly fall within the basis teaching herein set forth.

What is claimed is:

1. An electric discharge machining apparatus comprising:
   a processing electrode fed while a predetermined gap is maintained with respect to a workpiece;
   means for causing electric discharge to occur between a workpiece and said processing electrode, to electric-discharge-process said workpiece by the energy of said electric discharge;
   mounting means for mounting said workpiece;
   insulating means for electrically insulating said workpiece and said mounting means from each other; and
   switching means disposed on said mounting means for selectively switching between an open-circuit and a short circuit connection between said mounting means and said workpiece said switching means having a first rigid terminal which is directly mechanically connected to said mounting means to provide an electrical connection between said switching means and said mounting means.

2. An electric discharge machining apparatus according to claim 1, wherein said rigid terminal comprises a magnet, said switching means being mechanically connected to said mounting means by said magnet.

3. An electric discharge machining apparatus according to claim 1, wherein said switching means is fixedly mounted directly on said mounting means.

4. An electric discharge machining apparatus according to claim 1 wherein said switching means comprises:
   case means;
   first terminal means formed on said rigid terminal and having contact means, said first terminal means being mounted on said case means;
   second terminal means connected to said workpiece and spaced away from said first terminal means, said second terminal means having contact means and being mounted on said case means;
   extendible and contractible means arranged within said case means, said extendible and contractible means having one end thereof on which a pair of contact means are mounted, said pair of contact means being movable;
   a source of pressure connected to the other end of said extendible and contractible means; and
   spring means arranged within said case means for biasing said extendible and contractible means against the pressure introduced into said extendible and contractible means,
   wherein introduction of the pressure into said extendible and contractible means enables said extendible and contractible means to be moved against a spring force of said spring means to that said pair of contact means are in contact respectively with said contact means of said first terminal means and said contact means of said second terminal means, and
   wherein evacuation of the pressure from said extendible and contractible means enables said extendible and contractible means to be moved by the spring force of said spring means so that said pair of contact means are spaced respectively apart away from said contact means of said first terminal means and said contact means of said second terminal means.

5. An electric discharge machining apparatus according to claim 4, wherein said switching means is fixedly mounted directly on said mounting means.

6. An electric discharge machining apparatus for machining a workpiece comprising:
   a processing electrode fed while a predetermined gap is maintained with respect to the workpiece;
   mounting means for mounting said workpiece for machining;
   processing liquid supply means for providing a processing liquid to said workpiece and operative to place said workpiece and mounting means in a processing said liquid environment while said workpiece is being machined by said processing electrode;
   insulating means for electrically insulating said workpiece from said mounting means;
   switch means comprising first and second contacts and a connector selectably joining said contacts, said switch means being removably attached to said mounting means by a rigid connection member which provides an electrical connection from said mounting means to one of said first and second contacts; and
   electrical connection means connecting the other of said first and second contacts with said workpiece, said switch means being attached to a position on said mounting means such that the length of said electrical connection means is substantially minimized,
   whereby said switch means is operative to provide an electrical short circuit connection state, through a conducting loop, between said workpiece and said mounting means for a first processing operation and to provide an open circuit isolation state of said workpiece from said mounting means for a second processing operation.

7. An electric discharge machining apparatus for machining a workpiece as set forth in claim 6 wherein said open circuit isolation state between said workpiece and mounting means is operative to isolate said switch electrically and to reduce the effect of stray capacitance in said apparatus on said second machining processing.

8. An electric discharge machining apparatus for machining a workpiece as set forth in claim 6 wherein said switch means comprises one of a pneumatic or hydraulic activated switch mechanism.

9. An electric discharge machining apparatus for machining a workpiece as set forth in claim 6 wherein said conducting loop is made as short as possible to reduce inductance.

10. An electric discharge machining apparatus comprising:
    an electrode:
    means for causing electric discharge to occur across a gap defined between said electrode and a workpiece;
    mounting means for holding the workpiece in place;
    insulating means for electrically insulating the workpiece from said mounting means;
    a switch comprising first and second rigid terminal members, said first rigid terminal member having a first stationary contact formed thereon, said second rigid terminal member having a second stationary contact formed thereon, said switch further comprising movable contact means for selectively providing an electrical connection between said first and second stationary contacts, said first rigid terminal member being directly mechanically connected to said mounting means to establish an electrical connection therebetween and said second rigid terminal member being electrically connected to the workpiece.

* * * * *